United States Patent
Tomonari et al.

(10) Patent No.: US 12,221,355 B2
(45) Date of Patent: Feb. 11, 2025

(54) TITANIUM OXIDE PARTICLES AND MANUFACTURING METHOD THEREFOR

(71) Applicant: ISHIHARA SANGYO KAISHA, LTD., Osaka (JP)

(72) Inventors: Masanori Tomonari, Osaka (JP); Kiyonobu Ida, Osaka (JP); Takuya Hosokawa, Osaka (JP)

(73) Assignee: ISHIHARA SANGYO KAISHA, LTD., Osaka (JP)

( * ) Notice: Subject to any disclaimer, the term of this patent is extended or adjusted under 35 U.S.C. 154(b) by 911 days.

(21) Appl. No.: 16/980,456

(22) PCT Filed: Mar. 27, 2019

(86) PCT No.: PCT/JP2019/013090
§ 371 (c)(1),
(2) Date: Sep. 14, 2020

(87) PCT Pub. No.: WO2019/189307
PCT Pub. Date: Oct. 3, 2019

(65) Prior Publication Data
US 2021/0017037 A1   Jan. 21, 2021

(30) Foreign Application Priority Data
Mar. 28, 2018   (JP) ................................ 2018-062355

(51) Int. Cl.
*C01G 23/053* (2006.01)
(52) U.S. Cl.
CPC ...... *C01G 23/0536* (2013.01); *C01P 2004/52* (2013.01); *C01P 2004/62* (2013.01); *C01P 2004/64* (2013.01); *C01P 2006/12* (2013.01)
(58) Field of Classification Search
CPC ................................................ C01G 23/0536
See application file for complete search history.

(56) References Cited

U.S. PATENT DOCUMENTS

| | | | |
|---|---|---|---|
| 4,923,682 A | 5/1990 | Roberts | |
| 6,403,689 B1 | 6/2002 | Lehaut | |
| 9,108,862 B2 | 8/2015 | Christal | |
| 2013/0143729 A1 | 6/2013 | Morita | |
| 2017/0137301 A1 | 5/2017 | Kaji | |

FOREIGN PATENT DOCUMENTS

| | | | |
|---|---|---|---|
| EP | 0 335 773 | | 10/1989 |
| JP | 2011-063496 | | 3/2011 |
| JP | 2011063496 A | * | 3/2011 |
| WO | 2012/023621 | | 2/2012 |
| WO | 2016/002755 | | 7/2016 |

OTHER PUBLICATIONS

Search Report issued in corresponding EP 19776502.7, Dec. 13, 2021, pp. 1-6.
Search Report issued in PCT/JP2019/013090, May 28, 2019, translation, p. 1.
Written Opinion issued in PCT/JP2019/013090, May 28, 2019, pp. 1-5.

* cited by examiner

*Primary Examiner* — Yong L Chu
(74) *Attorney, Agent, or Firm* — Jeffrey S. Melcher; Melcher Patent Law PLLC

(57) ABSTRACT

The present invention manufactures titanium oxide particles that have a small degree of aggregation (size of aggregate particle diameter relative to primary particle diameter) and are not readily sintered by heating. The present invention has: a step in which an alkali and a solution including a carboxylic acid and a titanium (oxy)chloride are mixed, and the titanium (oxy)chloride is hydrolyzed by neutralization; and a step in which, after the hydrolysis by neutralization, the solution is heated to a temperature of 80° C. or more and 110° C. or less, and the titanium (oxy)chloride remaining in the solution is hydrolyzed by heating. It is thus possible to obtain titanium oxide particles that have a small degree of aggregation and a range of 1-35 for the ratio (D90/BET diameter) between the 90% cumulative mass particle size distribution diameter (D90) (nm) as measured by a dynamic light-scattering particle diameter distribution measurement device and the BET diameter (nm) as calculated from the specific surface area of the titanium oxide particles.

12 Claims, 3 Drawing Sheets

TITANIUM OXIDE PARTICLES AND MANUFACTURING METHOD THEREFOR

TECHNICAL FIELD

The present invention relates to titanium oxide particles and the method for manufacturing the same.

BACKGROUND ART

Titanium oxide particles having an average primary particle diameter of 0.1 μm or less (, which are also referred to as "titanium oxide fine particles" in the present application) have transparency against visible light and shielding properties against ultraviolet light, and thus are used as sunscreen cosmetics and ultraviolet light shielding paints. Also, since the titanium oxide particles have a high specific surface area, they are used as catalyst supports for denitration catalysts, dioxin decomposing catalysts, and the like. Also, since the titanium oxide particles are excited by irradiation with ultraviolet light to exhibit photocatalytic activity, hydrophilic activity, or anti-fogging activity, they are used for photocatalysts and electrodes for solar cells.

The titanium oxide particles are also used as raw materials for manufacturing the titanium composite oxide, such as barium titanate, strontium titanate, or lithium titanate which are known as dielectric materials for a multilayer ceramic capacitor (MLCC).

The method for manufacturing the titanium oxide particles is generally classified into a "gas phase method" of oxidizing or hydrolyzing titanium (oxy)chloride such as titanium tetrachloride in a gas phase, and a "liquid phase method" of hydrolyzing titanium (oxy)chloride such as titanium tetrachloride in a liquid phase. In general, the titanium oxide particles obtained by the "liquid phase method" tend to exhibit less mixing of chlorine derived from the raw material, and thus are appropriate to applications that require such physical properties (, for example, raw materials for dielectric materials).

As the "liquid phase method", Patent Literature 1 describes, for example, the following methods: a method of hydrolyzing titanium (oxy)chloride as a titanium source by neutralization with alkali; and a method of subjecting titanium (oxy)chloride as a titanium source to the first hydrolysis, further adding a titanium source thereto, and then performing the second hydrolysis. Patent Literature 1 describes that according to this method, the titanium oxide particles can be manufactured in which a BET diameter calculated from the specific surface area of the titanium oxide particles is 1 to 50 nm; when a diameter of an agglomerated particle formed by the titanium oxide particles is defined as the 50% cumulative mass particle size distribution diameter (D50) measured by a laser diffraction/scattering particle size distribution analyzer, the agglomerated particle diameter is 1 to 200 nm; and a ratio therebetween (i.e., the agglomerated particle diameter/the BET diameter) is 1 to 40.

CITATION LIST

Patent Literature

PATENT LITERATURE 1: WO 2016/002755 A1

SUMMARY OF INVENTION

Technical Problem

Generally, in the "liquid phase method", when the primary particle diameter of the titanium oxide particles decreases, the agglomeration thereof in a solution occurs, and thus the agglomerated particle diameter is likely to increase. Also, when the primary particle diameter of the titanium oxide particles is small, the sintering of the particles each other when heated is likely to occur. Although the titanium oxide particles manufactured by the above-described prior art have a small primary particle diameter and a relatively small agglomerated particle diameter, the degree of the agglomeration (namely, the agglomerated particle diameter size relative to the primary particle diameter size) thereof is still large. When the degree of the agglomeration of the titanium oxide particles is large, problems occur such as a decrease in transparency of visible light, and a deterioration of dispersibility in a solvent. Also, there is a problem that the reactivity decreases by insufficiently mixing with other raw materials (for example, a barium source), so that fine reaction products cannot be obtained. Also, there is a problem that when the titanium oxide particles are heated, the sintering of the particles each other is likely to occur, and the reactivity with other raw materials (for example, a barium source) decreases by such a sintering, so that fine reaction products cannot be obtained.

Solution to Problem

The present inventors further studied the condition of the hydrolysis of titanium (oxy)chloride. As a result, the present inventors have found that the titanium oxide particles which can further reduce the degree of the agglomeration thereof can be manufactured by appropriately setting the conditions for the first hydrolysis step and the second hydrolysis step in a two-step hydrolysis, and thus have completed the present invention.

That is, the present invention includes the following inventions.

(1) A method for manufacturing titanium oxide particles, comprising:

a step of hydrolyzing a titanium (oxy)chloride by neutralization by mixing a solution containing a carboxylic acid and the titanium (oxy)chloride with an alkali; and a step of thermally hydrolyzing the titanium (oxy)chloride remaining in the solution after hydrolyzing the titanium (oxy)chloride by neutralization by heating the solution after hydrolyzing the titanium (oxy)chloride by neutralization at a temperature of 80° C. or more to 110° C. or less.

(2) The method according to (1), wherein the solution containing the carboxylic acid and the titanium (oxy)chloride in the step of hydrolyzing the titanium (oxy)chloride by neutralization is heated at a temperature of 40° C. or more and 80° C. or less before being mixed, during being mixed, or after being mixed with the alkali.

(3) The method according to (1) or (2), wherein in the step of hydrolyzing the titanium (oxy)chloride by neutralization, 0.1 to 50 mol % of the titanium (oxy)chloride is hydrolyzed, and then in the step of thermally hydrolyzing the titanium (oxy)chloride, the remaining titanium (oxy)chloride is hydrolyzed.

(4) Titanium oxide particles, wherein a ratio (D90/BET diameter) of a 90% cumulative volume particle size distribution diameter (D90) (nm) of the titanium oxide particles measured by a dynamic light scattering particle size distribution analyzer to a BET diameter (nm) calculated from a specific surface area of the titanium oxide particles is in a range of 1 to 35.

(5) The titanium oxide particles according to (4), wherein the 90% cumulative volume particle size distribution diameter (D90) is in a range of 10 to 180 nm.

(6) The titanium oxide particles according to (4) or (5), wherein a content of carbon contained in the titanium oxide particles is in a range of 0.4 to 10 mass %.

(7) The titanium oxide particles according to any one of (4) to (6), wherein a rutile ratio after the titanium oxide particles are heated at 600° C. for 2 hours is 10% or less.

(8) The titanium oxide particles according to any one of (4) to (7), wherein a BET specific surface area of the titanium oxide particles is 100 to 400 m²/g.

Advantageous Effects of Invention

According to the method for manufacturing the titanium oxide particles of the present invention, the titanium oxide particles can be obtained in which a ratio (D90/BET diameter) of the 90% cumulative volume particle size distribution diameter (D90) (nm) of the titanium oxide particles measured by a dynamic light scattering particle size distribution analyzer to the BET diameter (nm) calculated from the specific surface area of the titanium oxide particles is small. Here, the BET diameter can be understood as being an indicator for the primary particle diameter, and the D90 can be understood as being an indicator for the agglomerated particle diameter on the coarse side in the particle size distribution. As such, the fact that "D90/BET diameter" is small indicates the following: a difference between the primary particle diameter and the agglomerated particle diameter on the coarse side is small, and the degree of the agglomeration of the titanium oxide particles is small over almost the entire region of the particle size distribution.

In the titanium oxide particles of the present invention, the degree of the agglomeration thereof is small, and thus they have high transparency of visible light and good dispersibility in a solvent. Moreover, since the titanium oxide particles of the present invention can be sufficiently mixed with other raw materials (for example, a barium source), thereby making the reactivity better, fine reaction products can be obtained. Also, the titanium oxide particles of the present invention are less likely to cause the sintering of the particles each other when heated. Therefore, by using the titanium oxide particles of the present invention as a raw material, the titanium composite oxide having a smaller particle size can be manufactured.

DESCRIPTION OF EMBODIMENTS

Figure 1:
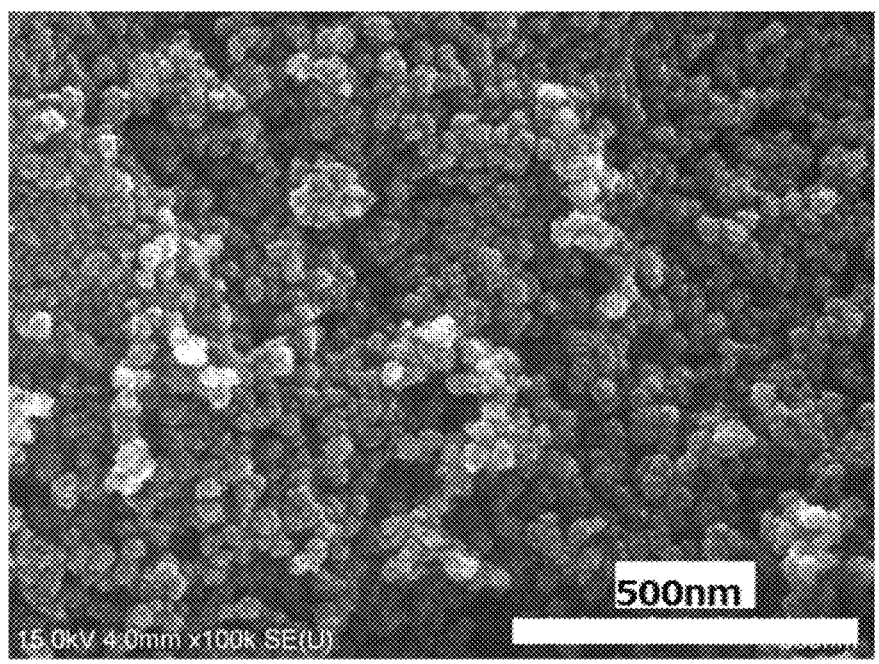
FIG. 1 is an electron micrograph of "Sample B" of Example 2.

A method for manufacturing the titanium oxide particles of the present invention includes: a step of hydrolyzing titanium (oxy)chloride by neutralization by mixing a solution containing carboxylic acid and titanium (oxy)chloride with an alkali; and a step of thermally hydrolyzing titanium (oxy)chloride remaining in the solution after hydrolyzing titanium (oxy)chloride by neutralization by heating the solution after hydrolyzing titanium (oxy)chloride by neutralization at a temperature of 80° C. or more to 110° C. or less.

In the present application, the "titanium (oxy)chloride" indicates to be titanium chloride or titanium oxychloride.

In the step of hydrolyzing titanium (oxy)chloride by neutralization, the solution containing carboxylic acid and titanium (oxy)chloride is firstly prepared. At this time, it is also possible that a mixed solution of carboxylic acid and an aqueous solvent is prepared and then this solution is mixed with titanium (oxy)chloride, it is also possible that a mixed solution of titanium (oxy)chloride and an aqueous solvent is prepared and then this solution is mixed with carboxylic acid, or it is also possible that an aqueous solvent, carboxylic acid, and titanium (oxy)chloride are mixed all at once. It is preferred that the solution is thoroughly stirred to sufficiently dissolve carboxylic acid. The concentration of titanium (oxy)chloride may also be appropriately adjusted by further adding water to the solution containing titanium (oxy)chloride and carboxylic acid. By making carboxylic acid included in the solution containing titanium (oxy) chloride, its titanium (oxy)chloride is stably present in the solution due to its carboxylic acid.

As the "titanium (oxy)chloride" in the manufacturing method of the present invention, titanium tetrachloride, titanium trichloride, and titanium oxychloride can be used, for example. Among them, titanium tetrachloride is preferred. The aqueous solvent indicates water or a solvent obtained by mixing water with an organic solvent such as alcohol. When the organic solvent is mixed, preferably, the content of the organic solvent is approximately 10 mass % or less of the aqueous solvent.

The "carboxylic acid" in the manufacturing method of the present invention includes polyvalent carboxylic acid and salts thereof, and for example, the following (a) to (g) are illustrated.

(a) Carboxylic acid: for example, formic acid, acetic acid, or propionic acid.

(b) Poly(valent) carboxylic acid: particularly, dicarboxylic acid, tricarboxylic acid, for example, oxalic acid, or fumaric acid.

(c) Hydroxy poly(valent) carboxylic acid: particularly, hydroxy di- or hydroxy tri-carboxylic acid, for example, malic acid, citric acid, or tartronic acid.

(d) (Polyhydroxy) monocarboxylic acid: for example, glucoheptonic acid, or gluconic acid.

(e) Poly(valent) (hydroxycarboxylic acid): for example, tartaric acid.

(f) Dicarboxylic amino acid and amide corresponding to it: for example, aspartic acid, asparagine, or glutamic acid.

(g) Monocarboxylic amino acid which is hydroxylated or is not hydroxylated: for example, lysine, serine, or threonine.

As the salts of the carboxylic acid described above, any salt can be used without limitation, and for example, alkali metal salts such as sodium and potassium, and ammonium salts may be used.

The amount of carboxylic acid is preferably 0.1 to 50 mol %, and more preferably 0.1 to 12.5 mol % relative to the amount of titanium (oxy)chloride. Also, when citric acid is used as a polyvalent carboxylic acid, the amount of citric acid is preferably 0.5 to 15 mass %, and more preferably 1 to 5 mass % based on mass % relative to the amount of titanium (oxy)chloride in terms of titanium oxide.

Next, the above-described solution and an alkali are mixed. This gives rise to hydrolyze one part of titanium (oxy)chloride by neutralization, thereby manufacturing fine titanium oxide particles (i.e., seeds) in the solution.

As the alkali, any compound exhibiting alkaline can be used, and examples thereof include hydroxides of alkali metals, such as sodium hydroxide and potassium hydroxide; ammonium compounds such as an ammonia aqueous solution and ammonia gas; and amine compounds such as alkylamine and ethanolamine. As the alkali, ammonium compounds or amine compounds, which do not remain as impurities in the titanium oxide particles, are preferred, and the ammonia aqueous solution is particularly preferred. The additive amount of the alkali is preferably such that the amount for hydrolyzing titanium (oxy)chloride by neutralization is 0.1 to 50 mol %, and more preferably 0.25 to 40 mol %. The specific additive amount of the alkali for controlling an amount for hydrolyzing titanium (oxy)chloride by neutralization to the above-described numerical range is, although depend on the amount of the base contained in the alkali, preferably in a range of 1 to 200 mol %, and more preferably in a range of 1 to 150 mol % relative to the amount of titanium (oxy)chloride. The fine particles (i.e., seeds) as a precursor of the titanium oxide particles are manufactured through the reaction that hydrolyzes titanium (oxy)chloride by neutralization.

When the reaction that hydrolyzes titanium (oxy)chloride by neutralization is performed, the temperature of the solution is preferably set to room temperature (approximately 20° C.) to 80° C., more preferably 40° C. or more and 80° C. or less, and still more preferably 50° C. or more and 75° C. or less. At that time, the solution may be mixed with the alkali after the temperature of the solution is controlled so as to reach the above-described temperature range; the temperature of the solution may be controlled so as to reach the above-described temperature range during mixing with the alkali, or the temperature may be controlled so as to reach the above-described temperature range after mixing with the alkali.

However, when the heat to the above temperature is completed before mixing with the alkali, the hydrolysis of titanium (oxy)chloride by neutralization can be performed under a uniform temperature condition. Also, by heating the solution at the temperature of 40° C. or more in advance, the reaction that hydrolyzes titanium(oxy)chloride by neutralization can be sufficiently proceeded. Moreover, by setting the temperature of the solution to 80° C. or less, the occurrence of thermal hydrolysis of titanium (oxy)chloride during the hydrolysis of titanium (oxy)chloride by neutralization can be reduced. Since titanium (oxy)chloride is stabilized by carboxylic acid as described above, the thermal hydrolysis of titanium (oxy)chloride which occurs by being heated during the time until the temperature of the solution reaches the above-described temperature range is also sufficiently reduced.

After the addition of the alkali, the solution may be aged for several ten minutes to several hours while keeping the temperature of the solution. The aging time is preferably 5 minutes to 1.5 hours. The variations in the size and the number of seeds to be manufactured can be reduced by the aging.

Subsequent to the above step of hydrolyzing titanium (oxy)chloride by neutralization, the solution is heated at a temperature of 80° C. or more to 110° C. or less (, i.e., a step of thermally hydrolyzing the titanium (oxy)chloride). Here, the phrase "heating the solution at a temperature of 80° C. or more to 110° C. or less" means raising the temperature of the solution to 80° C. or more to 110° C. or less by heating the solution after hydrolyzing titanium (oxy)chloride by neutralization. As a result, the unreacted titanium (oxy) chloride remaining in the solution after hydrolyzing titanium (oxy)chloride by neutralization is thermally hydrolyzed, and this hydrolysis makes the fine titanium oxide particles (i.e., seeds) manufactured through the hydrolysis of titanium (oxy)chloride by neutralization grown, thereby obtaining the titanium oxide particles.

In the step of thermally hydrolyzing titanium (oxy)chloride, one part of titanium (oxy)chloride in the solution may remain. However, it is preferred that all titanium (oxy) chloride in the solution is used (i.e., all titanium (oxy) chloride in the solution is thermally hydrolyzed so as to be converted into titanium oxide). Accordingly, the temperature of the solution at the time of thermally hydrolyzing titanium (oxy)chloride is preferably set to be higher, preferably 85° C. or more, more preferably 90° C. or more, and still more preferably 95° C. or more from the viewpoint of increasing the reaction ratio.

After the temperature of the solution reaches the above thermal hydrolysis temperature, the solution may be aged for several ten minutes to several hours while keeping the temperature of the solution. The aging time is preferably 5 minutes to 3 hours. The aging is expected to provide an effect such as an increase in the reaction yield, a sharp shape in particle size distribution of the manufactured particles, or an increase in crystallinity of particles.

As described above, in the method for manufacturing the titanium oxide particles of the present invention, carboxylic acid and titanium (oxy)chloride are mixed in advance, then the alkali is mixed to hydrolyze one part of the titanium (oxy)chloride by neutralization, and then the remaining titanium (oxy)chloride is thermally hydrolyzed at a temperature from 80 to 110° C. By using such a process, the titanium oxide particles which have a small difference between the primary particle diameter and the agglomerated particle diameter on the coarse side (specifically, the D90/BET diameter is 1 to 35) and which reduce the sintering of the particles each other when heated can be simply and easily obtained.

Also, the titanium oxide particles having the above-described properties can be more simply and more easily obtained by appropriately controlling the abundance of carboxylic acid. the type of carboxylic acid, the amount for hydrolyzing titanium (oxy)chloride by neutralization (i.e., the production amount of the seeds), the temperature for thermally hydrolyzing titanium (oxy)chloride, and the like, as described above.

The method for manufacturing the titanium oxide particles of the present invention uses a two-step hydrolysis process as described above, but the total amount of titanium (oxy)chloride as a titanium source used throughout the two step hydrolysis process can be charged at the first step of hydrolyzing titanium (oxy)chloride by neutralization. Such a process provides an advantage of facilitating the control of the amount for hydrolyzing titanium (oxy)chloride in the step of hydrolyzing titanium (oxy)chloride by neutralization as compared to a case of charging titanium (oxy)chloride as a titanium source in each step.

It may also be possible that an alkali or acid is added to the solution containing the titanium oxide particles manufactured by the above-described method to adjust the pH to a range of 0 to 9, and then the solution is aged while keeping the temperature of the solution at 50 to 90° C. The aging time is approximately 10 minutes to 5 hours. The aging enhances crystallinity of the titanium oxide particles, reduces the degree of the agglomeration thereof, and adjusts the primary particle diameter (i.e., BET diameter) to an appropriate range.

The titanium oxide particles in a powder form may be manufactured by adding an alkali or acid as necessary to the solution containing the titanium oxide particles manufactured by the above-described method to adjust the pH to a range of 6.0 to 8.0, and optionally adding a flocculant, followed by filtration and drying.

The titanium oxide particles manufactured by the above-described method may also be fired. The firing temperature is preferably approximately 150 to 800° C., and from the viewpoint of making reactivity with barium, lithium or the like better as well as difficultly decreasing in the specific surface area, the firing temperature is more preferably in a range of 150 to 600° C. The firing time can be appropriately set and approximately 1 to 10 hours is appropriate. The firing atmosphere can be performed under an oxygen-containing atmosphere such as the atmosphere or an inert gas atmosphere such as nitrogen. Even when titanium oxide particles of the present invention are fired, progression of the transformation to rutile can be reduced and thus the sintering of the particles can be reduced.

The obtained titanium oxide particles may also be subjected to wet grinding or sizing by well-known methods as necessary. Also, thereafter, the surface of the particles may further be coated with, for example, hydrous oxides, hydroxides, or oxides of at least one selected from the group consisting of aluminum, silicon, zirconium, tin, titanium, and zinc in the same manner as in conventional titanium dioxide and titanium oxide fine particles for pigment. The amount of the coating treatment is preferably 1 to 50 mass %, and more preferably 5 to 30 mass % in total relative to the amount of the titanium oxide particles as a base material. This range is preferred in terms of avoiding the following problems: when the amount of the coating treatment is less than 1 mass % which is too small, effects such as desired light resistance cannot be obtained; whereas when the amount of the coating treatment is greater than 50 mass % which is too large, this causes not only the agglomeration but also economical disadvantages. Further, when the obtained titanium oxide particles are used as a catalyst support, a catalyst, a photocatalyst, and an adsorbent, catalyst components, for example, metals such as platinum, tungsten, copper, silver, and gold and compounds thereof may be supported on the titanium oxide particles by the ordinarily methods.

In order to coat the titanium oxide particles with an inorganic compound, for example, a wet process can be used in which the inorganic compound is added, with stirring, to a slurry in which the titanium oxide particles are dispersed in water; the pH is adjusted to precipitate the inorganic compound on the surface of the titanium oxide particles; and then filtration, washing, and drying are performed.

Also, the surface of the titanium oxide particles may also be coated with an organic compound such as fatty acid and a salt thereof, alcohol, an alkoxysilane compound, and an aminoalkoxysilane compound. The alkoxysilane compound and/or aminoalkoxysilane compound, and the like may also be coated in a hydrolyzed state. The amount of the coating treatment of the organic compound is preferably 1 to 50 mass %, and more preferably 5 to 30 mass % in total relative to the amount of the titanium oxide particles as a base material. This range is preferred in terms of avoiding the following problems: when the amount of the coating treatment is less than 1 mass % which is too small, effects such as desired dispersibility cannot be obtained; whereas when the amount of the coating treatment is greater than 50 mass % which is too large, this causes not only the agglomeration but also economical disadvantages. The two or more types of the organic compounds to be coated may be used in combination according to applications and purposes. Examples of the alkoxysilane compound include trimethoxyvinylsilane, methyltrimethoxysilane, propyltrimethoxysilane, i-butyl trimethoxysilane, n-butyl trimethoxysilane, n-hexyl trimethoxysilane, octyltrimethoxysilane, octyltriethoxysilane, n-decyl trimethoxysilane, and phenyltrimethoxysilane. Examples of the aminoalkoxysilane compound include γ-aminopropyltrimethoxysilane, γ-aminopropyltriethoxysilane, and N-β(aminoethyl)γ-aminopropyltrimethoxysilane.

For coating the titanium oxide particles with an organic compound, any of the following methods can be used, for example: (1) a dry process of charging the titanium oxide particles in a high-speed stirrer such as a Henschel mixer, adding an organic compound, or an aqueous or alcohol solution thereof thereto dropwise or by spraying while stirring, homogeneously stirring the mixture, and followed by drying; and (2) a wet process of adding an organic compound, or an aqueous or alcohol solution thereof to a slurry in which the titanium oxide particles are dispersed, while stirring, and thoroughly stirring the mixture, followed by filtration, washing, and drying.

In the titanium oxide particles of the present invention, the ratio (D90/BET diameter) of the 90% cumulative volume particle size distribution diameter (D90) (nm) of the titanium oxide particles measured by a dynamic light scattering particle size distribution analyzer and the BET diameter (nm) calculated from the specific surface area of the titanium oxide particles is in a range of 1 to 35.

The "titanium oxide" of the present invention includes that generally called hydrous titanium oxide, hydrated titanium oxide, metatitanic acid, and orthotitanic acid besides titanium dioxide and titanium monoxide.

The particle size distribution of the titanium oxide particles is determined by using a dynamic light scattering particle size distribution analyzer (Nanotrac UPA, manufactured by Nikkiso Co., Ltd.), adding a polycarboxylic acid-based dispersant to a slurry of the titanium oxide particles as described later, further adding a media (for example, zircon beads) thereto, and then measuring the sample treated by a disperser.

In a case where the titanium oxide particles are used as a raw material for manufacturing the titanium composite oxide such as barium titanate, the barium source and the titanium oxide particles are wet-mixed by a wet process in the presence of a media. In consideration of this, the particle size distribution is measured in the case where the titanium oxide particles are dispersed by a method closer to the condition for manufacturing the titanium composite oxide.

The 50% cumulative volume particle size distribution diameter in the particle size distribution measured as described above is defined as an average agglomerated particle diameter (D50). The average agglomerated particle diameter (D50) is preferably small, and specifically, preferably 5 to 100 nm, more preferably 6 to 80 nm, and still more preferably 7 to 70 nm.

The 90% cumulative volume particle size distribution diameter in the particle size distribution measured as described above is defined as an average agglomerated particle diameter (D90) on the coarse side. Similarly to the D50, the agglomerated particle diameter (D90) on the coarse side is also preferably small, and specifically, preferably 10 to 180 nm, and more preferably 10 to 160 nm.

As a method for confirming the state that the coarse particles exist, a particle counting-type particle size distribution analyzer can be used besides the method using the above-described dynamic light scattering particle size distribution analyzer. Examples of such an analyzer include a single particle optical sizing system (Accusizer FX-Nano dual) manufactured by Particle Sizing Systems.

In the particle counting-type particle size distribution analyzer, the particle size distribution is determined by measuring the size of each one particle and counting the number of the particles, and thus the presence of the coarse particles can be grasped in a state closer to the actual state.

The BET diameter is calculated from the BET specific surface area using "Equation 1" described later. The BET specific surface area can be determined using a Surface Area Analyzer (FlowSorbII 2300, manufactured by Shimadzu Corporation) by a nitrogen adsorption method (BET method). The above-described BET diameter can be understood as an indicator for the primary particle diameter of the titanium oxide particles. The BET diameter is preferably 1 to 40 nm, more preferably 1 to 20 nm, and still more preferably 1 to 10 nm. When the BET diameter falls within the above-described range, the transparency of visible light is high and the dispersibility in a solvent is good. In this case, since mixing with other raw materials (for example, a barium source) can be sufficiently performed as well, the reactivity becomes better, thereby obtaining fine reaction products.

Also, a larger specific surface area of the titanium oxide particles indicates a smaller BET diameter, which is preferable. Specifically, the specific surface area is preferably 50 to 400 m$^2$/g, 100 to 400 m$^2$/g, and still more preferably 200 to 400 m$^2$/g.

Also, the ratio (D50/BET diameter) of the average agglomerated particle diameter (D50) to the above-mentioned BET diameter represents the degree of the agglomeration, and a smaller value of this ratio represents a smaller degree of the agglomeration. The "D50/BET diameter" is preferably in a range of 1 to 20, and more preferably in a range of 1 to 15.

The ratio (D90/BET diameter) of the agglomerated particle diameter on the coarse side (D90) to the above-mentioned BET diameter also represents the degree of the agglomeration, and a smaller value of the ratio represents a smaller degree of the agglomeration. The "D90/BET diameter" of the titanium oxide particles of the present invention is in a range of 1 to 35, and preferably in a range of 1 to 30, or may be in a range of 10 to 30.

When the BET diameter (corresponding to the primary particle diameter) is a relatively small value, the primary particles of titanium oxide are likely to agglomerate, and thus the "D90/BET diameter" tends to be large. On the contrary, the titanium oxide particles of the present invention have the following characteristics: even in a case where the BET diameter is sufficiently small (preferably 1 to 40 nm, more preferably 1 to 20 nm, and still more preferably 1 to 10 nm), the "D90/BET diameter" is a small value (specifically, 1 to 35, preferably 1 to 30), and thus the degree of the agglomeration is small.

The "D90/BET diameter" is a numerical value that more directly reflects the presence of the coarse particles in the particle size distribution compared to the "D50/BET diameter". That is, even when the "D50/BET diameter" is a very small value, the "D90/BET diameter" diameter becomes large in a case where the degree of the agglomeration on the coarse side in the particle size distribution is large, for example, in a case where the coarse agglomerated particles are partly contained From the viewpoint of reactivity with a barium source or the like when manufacturing the titanium composite oxide, the presence of the coarse agglomerated particles is not preferable, and the degree of the agglomeration on the coarse side is preferably reduced as much as possible. From this point of view, when the "D90/BET diameter" of titanium oxide particles is in a range of 1 to 35, the difference in the primary particle diameter and the agglomerated particle diameter on the coarse side is small, and the degree of the agglomeration becomes small over almost the entire region of the particle size distribution. Thus, the transparency of visible light is high and the dispersibility in a solvent is good, and further since mixing with other raw materials (for example, a barium source) can be sufficiently performed, the reactivity becomes better, thereby obtaining fine reaction products.

As repeatedly described, even when the "D50/BET diameter" is a very small value, the "D90/BET diameter" becomes large in a case where the degree of the agglomeration on the coarse side in the particle size distribution is large, for example, in a case where the coarse agglomerated particles are partly contained. For this reason, even when the titanium oxide particles having the same "D50/BET diameter" as the present invention exist, a greater degree of the agglomeration on the coarse side in the particle size distribution results in a large "D90/BET diameter", and thus just because the titanium oxide particles having the same "D50/BET diameter" as the present invention exist, it does not indicate to have the "D90/BET diameter" of 1 to 35, which is the same as the present invention. That is, even when the titanium oxide particles having the same "D50/BET diameter" as the present invention exist, the above-described effects provided by the present invention cannot be obtained with only this fact. For obtaining the above-described effects provided by the present invention, it is necessary to reduce the degree of the agglomeration on the coarse side in the particle size distribution as much as possible from the viewpoint of the reactivity with a barium source or the like when manufacturing the titanium composite oxide. For achieving this, it is important that the "D90/BET diameter" of the titanium oxide particles is in a range of 1 to 35 (preferably in a range of 1 to 30).

Titanium oxide may contain impurities such as chlorine, sulfur, alkali metals, and alkaline earth metals, and the impurities are measured by X-ray fluorescence spectrometry, ICP analysis, or the like.

When the titanium oxide particles of the present invention contain chlorine as the impurity, the content thereof is preferably 0.04 mass % or less, more preferably 0.02 mass % or less, and still more preferably 0.01 mass % or less relative to the amount of titanium oxide. When the content of chlorine falls within the above-described range, the transformation of titanium oxide into a rutile type when heated is reduced, and the sintering of the particles each other when heated is less likely to proceed. Thus, this is preferred for raw materials for manufacturing the titanium composite oxide of dielectric materials (for example, barium titanate). The content of chlorine is measured using an X-ray fluorescent spectrometer (RIX2100, manufactured by Rigaku Corporation).

The titanium oxide particles of the present invention may also contain the carboxylic acid that was used in the manufacturing process thereof, and may also contain carbon or carbon compounds transformed from the carboxylic acid by heating. The content of carbon when representing these substances as a carbon atom is preferably 0.4 mass % or more, and more preferably 0.6 mass % or more. The content of carbon is measured using a CHN analyzer (vario EL III, manufactured by Elementar).

A larger content of carbon in the titanium oxide particles does not necessarily tend to yield the above-described effects (for example, the reduction of the sintering), and even in the case where content of carbon is relatively small, it sufficiently yields the above-described effects. Accordingly, the amount of carbon is preferably 0.4 mass % or more and 10 mass % or less, and more preferably 0.6 mass % or more and 8 mass % or less. The content of carbon contained in the titanium oxide particles can be adjusted according to the amount of the organic substance (for example, carboxylic acid) to be used in the manufacturing process. Although the specific mechanism is not clear, by making the organic substance such as carboxylic acid (, e.g., carbon derived from carboxylic acid) used in the manufacturing process contained in the above-described predetermined amount, the transformation to a rutile type when heating the titanium oxide particles is reduced, and further the sintering of the particles each other is reduced.

The titanium oxide particles of the present invention may be any crystalline type of an anatase type and a rutile type, or may be amorphous. The anatase type is preferable for manufacturing the titanium composite oxide, and the anatase type is preferable for use in photocatalysts or the like. The crystalline type of the titanium oxide particles is determined from an X-ray diffraction spectrum measured by using an X-ray diffractometer (Ultima IV, manufactured by Rigaku Corporation).

When the crystalline type of the titanium oxide particles of the present invention is the anatase type, the rutile ratio after heating the titanium oxide particles at 600° C. for 2 hours is preferably 10% or less, and more preferably 5% or less. The rutile ratio refers to the content of the rutile-type titanium oxide in the entire titanium oxide, and is calculated based on "Equation 2" described later.

When manufacturing the titanium composite oxide, the titanium oxide particles and a barium source or the like are mixed and heated. The crystalline type of the titanium oxide particles tends to be transformed from the anatase type to the rutile type due to being heated at a high temperature. The reactivity with other raw materials such as the barium source is expected to be different depending on whether the crystalline type of the titanium oxide particles is the rutile type or the anatase type. Due to such a difference in reactivity, it becomes difficult to control the particle size distribution of the produced titanium composite oxide when titanium oxide particles that have a large tendency to transform into rutile type when heated are used as the raw material. Thus, when the rutile ratio falls within the above-described range, the reactivity with other raw materials such as the barium source can be made more uniform, so that the control of the particle size distribution of the titanium composite oxide is facilitated.

In the titanium oxide particles of the present invention, the primary particles agglomerate at a certain level to form the agglomerated particles, and thus a space between the primary particles each other can be understood as a pore. As such, the pore volume can be measured by an automatic specific surface area/pore distribution measurement instrument (BELSORP-miniII, manufactured by BEL Japan, Inc.) by the BJH method. When the pore volume is large, the contact area with barium, lithium, and the like is large, and thus the reactivity is good. Specifically, the pore volume in a pore size (diameter) of 1 to 100 nm is preferably in a range of 0.2 to 0.7 ml/g, and more preferably 0.3 to 0.6 ml/g.

The primary particle diameter of the titanium oxide particles is formed of the agglomeration of crystallites, and thus it is preferred to minimize the size of this crystallite in the case of making the primary particle diameter finer. The crystallite size can be calculated from the X-ray diffraction peak of the (101) plane for the anatase type, or the X-ray diffraction peak of (110) plane for the rutile type by using the Scherrer's equation. For example, the crystallite size is preferably 20 to 250 Å, more preferably 20 to 150 Å, and still more preferably 50 to 100 Å.

$$DHKL = K^* \lambda / (\beta \cos \theta) \qquad \text{Scherrer's equation:}$$

wherein DHKL: average crystallite size (Å), $\lambda$: wavelength of X-rays, $\beta$: full width at half maximum of the diffraction peak, $\theta$: Bragg's angle, and K: constant (0.9).

When the composite oxide with at least one metal element (excluding titanium) is manufactured using the titanium oxide particles of the present invention, the fine titanium composite oxide with high crystallinity can be obtained. Examples of the metal element include at least one selected form the group consisting of typical metal elements (i.e., alkali metal elements (Group 1 elements), alkaline earth metal elements (Group 2 elements), Group 12 elements, Group 13 elements, Group 14 elements, and Group 15 elements), and transition metal elements (excluding titanium). For example, lithium titanate is useful as negative electrode active materials for lithium secondary batteries, sodium titanate is useful as raw materials or intermediates for manufacturing various titanic acid compounds, and potassium titanate is useful as fillers. Also, calcium titanate, strontium titanate, and barium titanate are useful as dielectric materials. In addition, for example, aluminium titanate, aluminum magnesium titanate, and the like are useful as heat-resistant materials, and lead titanate and the like are useful as piezoelectric materials. These composite oxides are manufactured by mixing and reacting the titanium oxide particles of the present invention with at least one metal compound, or firing a mixture thereof.

EXAMPLES

Hereinafter, Examples of the present invention will be described. However, the present invention is not limited to these examples.

Example 1

90 g of titanium tetrachloride as TiO$_2$, 2 mass % (relative to TiO$_2$) of anhydrous citric acid, and 1,350 ml of pure water were placed in a beaker and mixed at room temperature. Thereafter, the temperature was raised to 40° C., and an aqueous solution containing 50 mol % (relative to titanium tetrachloride) of ammonia (specifically, ammonia aqueous solution) was added over 30 minutes. Further, the resulting mixture was aged for 30 minutes while keeping the temperature to hydrolyze titanium tetrachloride by neutralization, thereby manufacturing titanium oxide (i.e., seed).

Subsequently, the temperature of the solution containing titanium oxide (i.e., seed) was raised to 90° C. and then maintained for 60 minutes to thermally hydrolyze the remaining titanium tetrachloride, thereby obtaining the deposition of titanium oxide. The resulting titanium oxide particles were filtered and washed, and then dried, and thus the powders of the titanium oxide particles (sample A) were obtained.

Examples 2 to 11

Based on the manufacturing method described in Example 1, the powders of the titanium oxide particles (samples B to K) were obtained in the same manner as in Example 1 except that the amount of anhydrous citric acid, the treatment temperature in the step of hydrolyzing titanium tetrachloride by neutralization, the additive amount of ammonia, and the treatment temperature in the step of thermally hydrolyzing titanium tetrachloride were appropriately changed as shown in Table 1.

Table 1 shows the calculated value of the amount for hydrolyzing titanium tetrachloride (TiCl$_4$) in the step of hydrolyzing titanium tetrachloride by neutralization on an assumption that approximately one fourth of the additive amount of ammonia is the amount for hydrolyzing titanium tetrachloride.

TABLE 1

| Examples | Samples | Citric acid [mass %] | Step of hydrolyzing titanium tetrachloride by neutralization | | | Step of thermally hydrolyzing titanium tetrachloride Temperature [° C.] |
|---|---|---|---|---|---|---|
| | | | Temperature [° C.] | NH$_3$ [mol %] | Amount for hydrolyzing TiCl$_4$ [mol %] | |
| Example 1 | A | 2 | 40 | 50 | 12.5 | 90 |
| Example 2 | B | 2 | 50 | 50 | 12.5 | 90 |
| Example 3 | C | 2 | 80 | 50 | 12.5 | 90 |
| Example 4 | D | 2 | 70 | 150 | 37.5 | 90 |
| Example 5 | E | 3 | 70 | 50 | 12.5 | 90 |
| Example 6 | F | 5 | 70 | 50 | 12.5 | 90 |
| Example 7 | G | 10 | 70 | 50 | 12.5 | 90 |
| Example 8 | H | 1 | 70 | 10 | 2.5 | 90 |
| Example 9 | I | 1 | 70 | 30 | 7.5 | 90 |
| Example 10 | J | 2 | 70 | 200 | 50 | 80 |
| Example 11 | K | 2 | 70 | 50 | 12.5 | 100 |

Examples 12 to 14

As for "Sample B" obtained in Example 2, the sample was heat-treated under the three conditions of 400° C., 500° C., and 600° C., respectively for 2 hours. As such, the powders of the titanium oxide particles (i.e., Samples L to N) were obtained.

Comparative Example 1

Based on the manufacturing method described in Example 1, the powders of the titanium oxide particles (i.e., Sample a) were obtained in the same manner as in Example 1 except that the additive amount of anhydrous citric acid was 0.

Comparative Example 2

To 1 L of ion exchanged water heated at 60° C., 100 g of an aqueous solution of titanium tetrachloride as TiO$_2$ and an ammonia aqueous solution were simultaneously added over 60 minutes, and the pH was kept at 5.8 to 6.2 to perform hydrolysis. The resulting slurry containing titanium oxide was filtered and washed, and then dried, and thus the powders of the titanium oxide particles (i.e., Sample b) were obtained.

Comparative Example 3

To 1 L of an aqueous solution containing 30 g/L of titanium tetrachloride as TiO$_2$, 3 mass % (relative to TiO$_2$) of anhydrous citric acid was added while keeping the temperature at room temperature, and the mixture was stirred for 30 minutes (the pH was 0 or less.). The temperature was raised to 92° C. and then kept with stirring for 30 minutes to perform the first hydrolysis. Then, 70 g of an aqueous solution of titanium tetrachloride as TiO$_2$ and an ammonia aqueous solution were simultaneously added under a temperature of 92° C. over 60 minutes, and the pH was kept at 0.8 to 1.2 to perform the second hydrolysis. The resulting slurry containing titanium oxide was neutralized to pH 6.5 with an ammonia aqueous solution, filtered and washed, and then dried, and thus powders of the titanium oxide particles (i.e., Sample c) were obtained.

Comparative Example 4

To 1 L of ion exchanged water heated at 60° C., 50 g of an aqueous solution of titanium tetrachloride as TiO$_2$, 3 mass % (relative to TiO$_2$) of anhydrous citric acid, and an ammonia aqueous solution were simultaneously added over 60 minutes, and the pH was kept at 0.8 to 1.2 to perform the first hydrolysis. Then, 50 g of an aqueous solution of titanium tetrachloride as TiO$_2$ was added and mixed, and the pH was adjusted to 1 or less. Thereafter, the temperature was raised to 92° C. and then kept with stirring for 30 minutes to perform the second hydrolysis. The resulting slurry containing titanium oxide was neutralized to pH 6.5 with an ammonia aqueous solution, filtered and washed, and then dried, and thus the powders of the titanium oxide particles (i.e., Sample d) were obtained.

<Evaluation 1>

Particle Size Distribution (D50 and D90):

A slurry was manufactured by adding 30 ml of pure water to 3 g of each of the powders of the titanium oxide particles in the various Examples and Comparative Examples (, i.e., Samples A to N and Samples a to d), and further adding 3 mass % of a polycarboxylic acid-based dispersant (Nopcosperse 5600, manufactured by San Nopco Limited) to each sample. The slurry and 60 g of zircon beads with a diameter (Φ) of 0.09 mm as a media were placed in a 70 ml mayonnaise jar, and dispersed in a paint shaker (Paint conditioner, manufactured by Red Devil, Inc.) for 60 minutes.

Using them as the samples for evaluation, the particle size distribution was measured by a dynamic light scattering particle size distribution analyzer (Nanotrac UPA, manufactured by Nikkiso Co., Ltd.). The setting conditions for the measurement were as follows.

(1) Refractive index of solvent (water): 1.333
(2) Refractive index of titanium oxide particles
Anatase type: 2.52
Rutile type: 2.72

(3) Density of titanium oxide
Anatase type: 3.9 g/cm³
Rutile type: 4.2 g/cm³

In the case of the mixed crystal of the anatase type and the rutile type, the conditions (i.e., particle refractive index and density) for a crystalline type with a larger existing ratio were set.

The 50% cumulative volume particle size distribution diameter in the particle size distribution thus measured was defined as the average agglomerated particle diameter (D50), and the 90% cumulative volume particle size distribution diameter was defined as the agglomerated particle diameter (D90) on the coarse side.

<Evaluation 2>
BET Specific Surface Area and BET Diameter:

The BET specific surface area (m²/g) for each of the powders of the titanium oxide particles in the various Examples and Comparative Examples (, i.e., Samples A to N and Samples a to d) was determined using a flow-type specific surface area automatic measuring apparatus (FlowSorbII 2300, manufactured by Shimadzu Corporation) by a nitrogen adsorption method (BET method). At this time, the desorption was performed under a nitrogen gas flow at room temperature, and the adsorption was performed at 77K.

The BET diameter was calculated from the BET specific surface area using "Equation 1" below.

$$d=6/(\rho \cdot a)$$ (Equation 1)

wherein d is the BET diameter (μm), ρ is the density of titanium oxide (g/cm³), and a is the BET specific surface area (m²/g). A value corresponding to the crystalline type (anatase type: 3.9, rutile type: 4.2) was used for the density of titanium oxide. In the case of the mixed crystal of the anatase type and the rutile type, a value of the density for a crystalline type with a larger existing ratio was used.

<Evaluation 3>
Carbon Content:

The content of carbon for each of the powders of the titanium oxide particles in the various Examples and Comparative Examples (, i.e., Samples A to N and Samples a to d) was measured using a CHN analyzer (vario EL III, manufactured by Elementar).

<Evaluation 4>
Crystalline Type and Rutile Ratio:

The X-ray diffraction spectrum for each of the powders of the titanium oxide particles in the various Examples and Comparative Examples (, i.e., Samples A to N and Samples a to d) was measured using an X-ray diffractometer (Ultima IV, manufactured by Rigaku Corporation) under the condition of the following: X-ray tube bulb: Cu; tube voltage: 40 kV; tube current: 40 mA; divergence slit: ½°; scattering slit: 8 mm; light-receiving slit: open; sampling width: 0.020 degrees; and scanning speed: 10.00 degree/min, thereby determining the crystalline type.

The rutile ratio was calculated from the height of the peak of the maximum peak corresponding to the rutile type crystal (Hr) and the height of the peak of the maximum peak corresponding to the anatase type crystal (Ha) in the X-ray diffraction spectrum using "Equation 2" below.

$$\text{Rutile ratio (\%)} = Hr/(Hr+Ha) \times 100$$ (Equation 2)

<Evaluation 5>
Pore Volume:

The pore volume in a pore size of 1 to 100 nm for each of the powders of the titanium oxide particles in the various Examples and Comparative Examples (, i.e., Samples A to N and Samples a to d) was determined by an automatic specific surface area/pore distribution measurement instrument (BELSORP-miniII, manufactured by BEL Japan, Inc.) by the BJH method.

<Evaluation 6>
Chlorine Amount:

An analysis sample for each of the powders of the titanium oxide particles in the various Examples and Comparative Examples (, i.e., Samples A to N and Samples a to d) was manufactured by press-molding. Then, all element order (specifically, semi-quantitative) analysis was performed by an X-ray fluorescent spectrometer RIX 2100, manufactured by Rigaku Corporation to determine the amount of chlorine.

Table 2 shows the results of Evaluations 1 to 6.

TABLE 2

| Examples | Samples | D50 [nm] | D90 [nm] | BET specific surface area [m²/g] | BET diameter [nm] | D90/BET diameter | Carbon content [mass %] | Crystalline type | Rutile ratio [%] | Pore volume [ml/g] | Chlorine amount [mass %] |
|---|---|---|---|---|---|---|---|---|---|---|---|
| Example 1 | A | 69 | 135 | 299 | 5 | 27 | 0.55 | A | 0 | 0.65 | 0.005 |
| Example 2 | B | 72 | 144 | 288 | 5 | 29 | 0.6 | A | 0 | 0.7 | 0.005 |
| Example 3 | C | 70 | 140 | 285 | 5 | 28 | 0.65 | A | 0 | 0.56 | 0.007 |
| Example 4 | D | 60 | 139 | 300 | 5 | 28 | 0.55 | A | 0 | 0.38 | 0.005 |
| Example 5 | E | 53 | 120 | 286 | 5 | 24 | 0.8 | A | 0 | 0.52 | 0.005 |
| Example 6 | F | 65 | 140 | 275 | 6 | 23 | 2.0 | A | 0 | 0.6 | 0.005 |
| Example 7 | G | 55 | 140 | 312 | 5 | 28 | 4.5 | A | 0 | 0.6 | 0.006 |
| Example 8 | H | 62 | 140 | 300 | 5 | 28 | 0.4 | A | 0 | 0.55 | 0.005 |
| Example 9 | I | 59 | 135 | 295 | 5 | 27 | 0.4 | A | 0 | 0.52 | 0.005 |
| Example 10 | J | 63 | 139 | 311 | 5 | 28 | 0.55 | A | 0 | 0.37 | 0.005 |
| Example 11 | K | 76 | 136 | 272 | 6 | 23 | 0.63 | A | 0 | 0.4 | 0.005 |
| Example 12 | L | 55 | 105 | 110 | 14 | 8 | 0.15 | A/r | 0.3 | 0.51 | 0.005 |
| Example 13 | M | 45 | 95 | 81 | 19 | 5 | 0.1 | A/r | 1.5 | 0.37 | 0.005 |
| Example 14 | N | 51 | 131 | 40 | 38 | 3 | 0.03 | A/r | 4 | 0.19 | 0.005 |
| Comparative Example 1 | a | 137 | 270 | 233 | 6 | 45 | 0.01 | R/a | 85 | 0.44 | 0.007 |
| Comparative Example 2 | b | 88 | 196 | 343 | 4 | 49 | 0.11 | A | 0 | 0.52 | 0.007 |
| Comparative Example 3 | c | 78 | 198 | 285 | 5 | 40 | 0.35 | A | 0 | 0.55 | 0.008 |

TABLE 2-continued

| Examples | Samples | D50 [nm] | D90 [nm] | BET specific surface area [m²/g] | BET diameter [nm] | D90/ BET diameter | Carbon content [mass %] | Crystalline type | Rutile ratio [%] | Pore volume [ml/g] | Chlorine amount [mass %] |
|---|---|---|---|---|---|---|---|---|---|---|---|
| Comparative Example 4 | d | 92 | 239 | 252 | 6 | 40 | 0.33 | A | 0 | 0.55 | 0.007 |

As is understood from "Table 2", the following has been found: the titanium oxide particles of the Comparative Examples exhibit the relatively large value of "D90/BET diameter"; whereas the titanium oxide particles of Examples 1 to 14 exhibit the small "D90/BET diameter" which is in a range of 1 to 35, and thus the difference between the primary particle diameter and the agglomerated particle diameter on the coarse side is small, and the degree of the agglomeration over the entire region of the particle size distribution is small.

Also, as for the titanium oxide particles of Examples 1 to 11 (Non heat treatment), the content of carbon in the titanium oxide particles of each of the Examples is 0.4 mass % or more, which is sufficiently large compared to that in the titanium oxide particles of each of the Comparative Examples. This can be understood as being one factor that the sintering of the titanium oxide particles of the Examples by heating is difficult to proceed.

Figure 2:
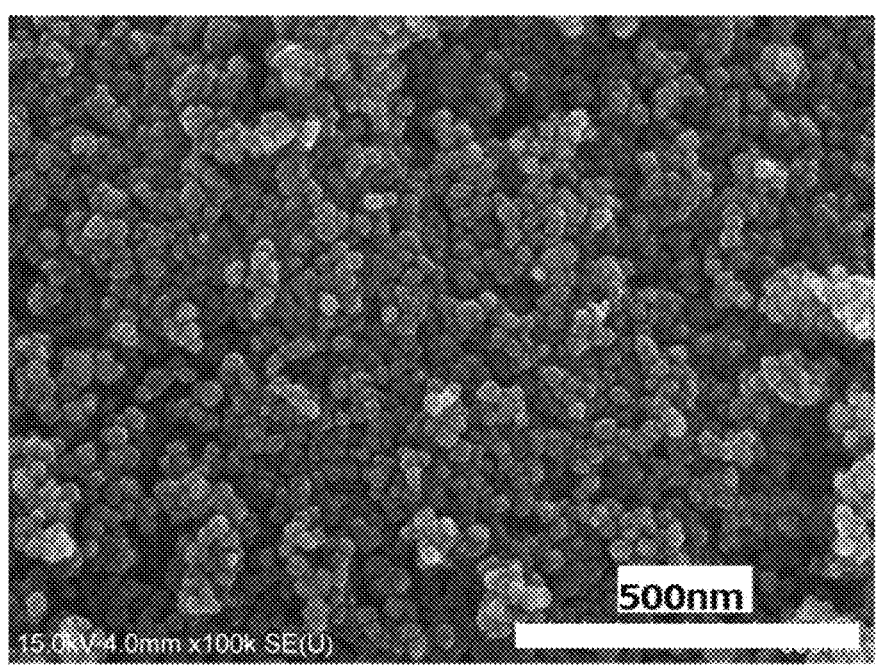
FIG. 2 is an electron micrograph after heating "Sample B" of Example 2.
Figure 3:
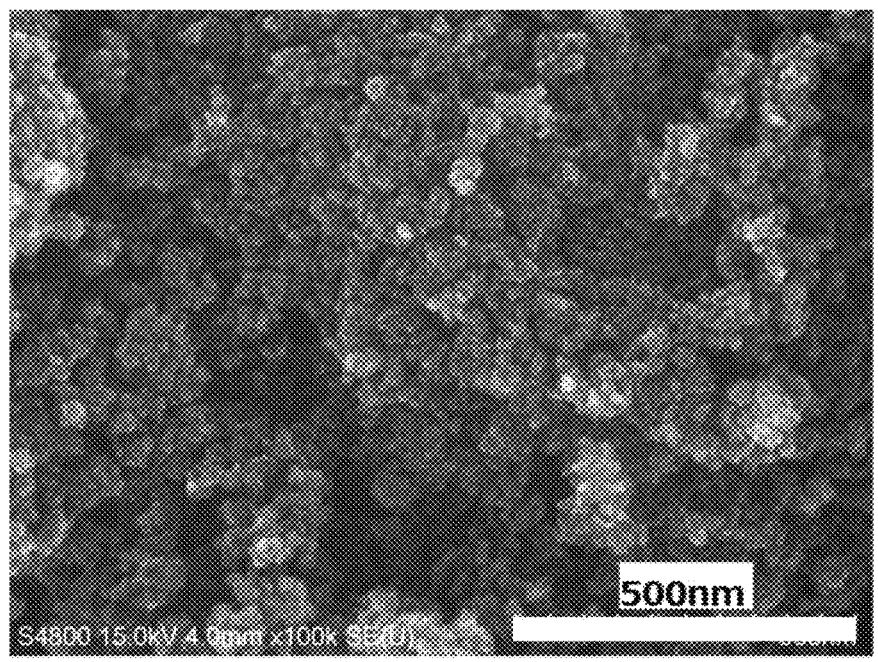
FIG. 3 is an electron micrograph of "Sample c" of Comparative Example 3.
Figure 4:
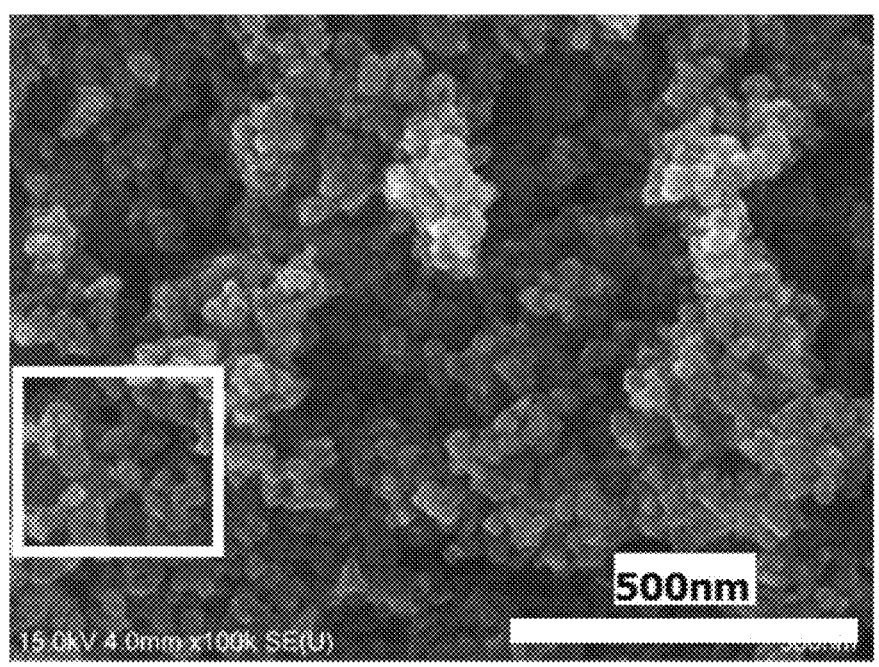
FIG. 4 is an electron micrograph after heating "Sample c" of Comparative Example 3.
Figure 5:
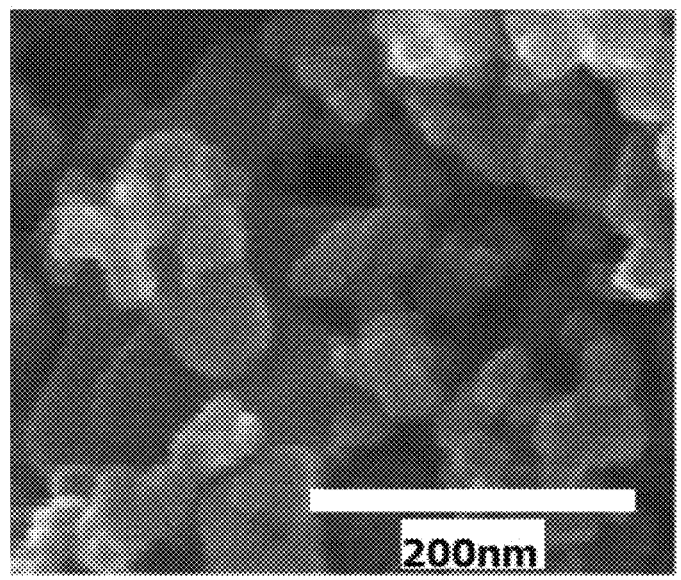
FIG. 5 is an enlarged view of the electron micrograph after heating "Sample c" of Comparative Example 3.

FIG. 1 is an electron micrograph of the titanium oxide particles of Example 2. FIG. 2 is an electron micrograph of the titanium oxide particles after heating them of Example 2 at 600° C. for 2 hours. FIG. 3 is an electron micrograph of the titanium oxide particles of Comparative Example 3. FIG. 4 is an electron micrograph of the titanium oxide particles after heating them of Comparative Example 3 at 600° C. for 2 hours. As is obvious from the figures, it has been found that the sintering of the particles each other when heated hardly occurs in the titanium oxide particles of the Examples. Meanwhile, in the titanium oxide particles of the Comparative Examples, the sintering of the particles each other when heated proceeds in many parts. For example, the enlarged view (shown in FIG. 5) of the part surrounded by the while line in FIG. 4 shows this state. Such a tendency is similarly found in comparison between the other Examples and the other Comparative Examples (not shown in the figures).

All the titanium oxide particles of Examples 1 to 11 (Non heat treatment) have a sufficiently large BET specific surface area, specifically, 250 m²/g or more, and those having a further large BET specific surface area exhibits a BET specific surface area of 300 m²/g or more. Also, although the titanium oxide particles of Examples 12 to 14 are prepared by heating the titanium oxide particles of Example 2 at 400 to 600° C., it has been found that the transformation to the rutile type due to being heated is sufficiently reduced, and the rutile ratio is a low value of 5% or less (specifically, 4%) even when heating at 600° C. for 2 hours.

(Manufacture of Lithium Titanate)

The ratio Li/Ti was set to 0.81, and a predetermined amount of LiOH.H₂O was weighed in a SUS container, and then pure water was charged in the container so that its concentration is 4.5 mol/L, thereby preparing an aqueous solution. Thereafter, each of the powders of Samples A to N was charged in the aqueous solution so that the solid content of the slurry is 60 g/L at room temperature, and the mixture was stirred for 30 minutes to disperse the powders. Then, the resultant was spray-dried by spray dry (manufactured by Yamato Scientific co., ltd.: nozzle type), thereby obtaining the dried powders (spray condition: inlet temperature of 190° C., outlet temperature of 85° C., and air pressure of 0.25 MPa).

A predetermined amount of the obtained dried powders was charged in a crucible and fired in a muffle furnace in a range of 400 to 600° C. The obtained sample was evaluated for X-ray diffraction and TG-DTA thermal analysis or the like. As a result, it has been found that the phase transformation and crystallization to $Li_4T_{15}O_2$ start in a relatively low temperature range, and the titanium oxide particles of the present invention have good reactivity with lithium.

(Manufacture of Barium Titanate)

100 g of each of the titanium oxide powders of Samples A to N and 1L of ion exchanged water were placed in a beaker to prepare an aqueous suspension. Then, the aqueous suspension and commercially available barium hydroxide $(Ba(OH)_2.8H_2O)$ (wherein Ba/Ti molar ratio=1.5) were placed in a 3 L-autoclave, then heated, and kept at 150° C. for 1 hour to perform the hydrothermal treatment under a saturated water vapor pressure. Thereafter, the obtained product was filtered with a suction filtration apparatus, washed, and dried at 105° C. to obtain the barium titanate powders. Further, 10 g of the dried product obtained by the above-described method was fired at 550° C. for 1 hour to obtain the barium titanate powders.

Each of the samples of the obtained barium titanate powders was evaluated for X-ray diffraction and TG-DTA thermal analysis or the like. As a result, it has been found that each of the samples has high crystallinity and is a compound having a small primary particle diameter, and the titanium oxide particles of the present invention have good reactivity with barium.

INDUSTRIAL APPLICABILITY

The titanium oxide particles of the present invention exhibit a small degree of the agglomeration (particularly, the degree of the agglomeration including coarse particles), and thus have good reactivity with barium, lithium, and the like. The titanium oxide particles of the present invention are appropriate to the various applications such as catalyst supports, catalysts, photocatalysts, and adsorbents in addition to the application such as raw materials used for manufacturing titanium composite oxides.

The invention claimed is:

1. A method for manufacturing titanium oxide particles, comprising:
    a step of hydrolyzing a titanium (oxy)chloride by neutralization by mixing a solution containing a carboxylic acid and the titanium (oxy)chloride with an alkali in a range of 1 to 200 mol % relative to an amount of the titanium (oxy)chloride; and
    a step of thermally hydrolyzing the titanium (oxy)chloride remaining in the solution after hydrolyzing the titanium (oxy)chloride by neutralization by heating the solution after hydrolyzing the titanium (oxy)chloride by neutralization at a temperature of 80° C. or more to 110° C. or less to form the titanium oxide particles having a ratio (D90/BET diameter) of a 90% cumulative volume particle size distribution diameter (D90)(nm) of the titanium oxide particles measured by a dynamic light scattering particle size distribution analyzer to a BET diameter (nm) calculated from a specific surface area of the titanium oxide particles is in a range of 1 to 35 and a content of carbon contained in the titanium oxide particles is in a range of 0.4 to 10 mass %.

2. The method according to claim 1, wherein the solution containing the carboxylic acid and the titanium (oxy)chloride in the step of hydrolyzing the titanium (oxy)chloride by neutralization is heated at a temperature of 40° C. or more and 80° C. or less before being mixed, during being mixed, or after being mixed with the alkali.

3. The method according to claim 1, wherein in the step of hydrolyzing the titanium (oxy)chloride by neutralization, 0.1 to 50 mol % of the titanium (oxy)chloride is hydrolyzed, and then in the step of thermally hydrolyzing the titanium (oxy)chloride, the remaining titanium (oxy)chloride is hydrolyzed.

4. Titanium oxide particles having a ratio (D90/BET diameter) of a 90% cumulative volume particle size distribution diameter (D90) (nm) of the titanium oxide particles measured by a dynamic light scattering particle size distribution analyzer to a BET diameter (nm) calculated from a specific surface area of the titanium oxide particles is in a range of 1 to 35 and a content of carbon contained in the titanium oxide particles is in a range of 0.4 to 10 mass %.

5. The titanium oxide particles according to claim 4, wherein the 90% cumulative volume particle size distribution diameter (D90) is in a range of 10 to 180 nm.

6. The titanium oxide particles according to claim 4, wherein a rutile ratio after the titanium oxide particles are heated at 600° C. for 2 hours is 10% or less.

7. The titanium oxide particles according to claim 4, wherein a BET specific surface area of the titanium oxide particles is 100 to 400 $m^2/g$.

8. The method according to claim 2, wherein in the step of hydrolyzing the titanium (oxy)chloride by neutralization, 0.1 to 50 mol % of the titanium (oxy)chloride is hydrolyzed, and then in the step of thermally hydrolyzing the titanium (oxy)chloride, the remaining titanium (oxy)chloride is hydrolyzed.

9. The titanium oxide particles according to 5, wherein a rutile ratio after the titanium oxide particles are heated at 600° C. for 2 hours is 10% or less.

10. The titanium oxide particles according to 5, wherein a BET specific surface area of the titanium oxide particles is 100 to 400 $m^2/g$.

11. The titanium oxide particles according to 6, wherein a BET specific surface area of the titanium oxide particles is 100 to 400 $m^2/g$.

12. Titanium oxide particles having a ratio (D90/BET diameter) of a 90% cumulative volume particle size distribution diameter (D90)(nm) of the titanium oxide particles measured by a dynamic light scattering particle size distribution analyzer to a BET diameter (nm) calculated from a specific surface area of the titanium oxide particles is in a range of 1 to 35 and a content of carbon contained in the titanium oxide particles is in a range of 0.4 to 10 mass %, formed by the process comprising:
   a step of hydrolyzing a titanium (oxy)chloride by neutralization by mixing a solution containing a carboxylic acid and the titanium (oxy)chloride with an alkali in a range of 1 to 200 mol % relative to an amount of the titanium (oxy)chloride; and
   a step of thermally hydrolyzing the titanium (oxy)chloride remaining in the solution after hydrolyzing the titanium (oxy)chloride by neutralization by heating the solution after hydrolyzing the titanium (oxy)chloride by neutralization at a temperature of 80° C. or more to 110° C. or less to form the titanium oxide particles.

* * * * *